(12) United States Patent
Song

(10) Patent No.: US 12,510,672 B2
(45) Date of Patent: Dec. 30, 2025

(54) DATA FUSION

(71) Applicant: Beijing Sankuai Online Technology Co., Ltd., Beijing (CN)

(72) Inventor: Shuang Song, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 616 days.

(21) Appl. No.: 17/908,921

(22) PCT Filed: Apr. 21, 2021

(86) PCT No.: PCT/CN2021/088652
§ 371 (c)(1),
(2) Date: Sep. 2, 2022

(87) PCT Pub. No.: WO2021/213432
PCT Pub. Date: Oct. 28, 2021

(65) Prior Publication Data
US 2023/0093680 A1   Mar. 23, 2023

(30) Foreign Application Priority Data

Apr. 21, 2020 (CN) .......................... 202010316189.0

(51) Int. Cl.
*G01S 17/89* (2020.01)
*G01S 7/481* (2006.01)
(Continued)

(52) U.S. Cl.
CPC ............ *G01S 17/89* (2013.01); *G01S 7/4814* (2013.01); *G01S 7/4817* (2013.01); *G01S 17/86* (2020.01); *G01S 17/931* (2020.01)

(58) Field of Classification Search
CPC ...................................................... G01S 17/89
See application file for complete search history.

(56) References Cited

U.S. PATENT DOCUMENTS 9,215,382 B1    12/2015  Hilde
2010/0157280 A1  6/2010  Kusevic et al.
(Continued)

FOREIGN PATENT DOCUMENTS

CN    105372717 A    3/2016
CN    205195875 U    4/2016
(Continued)

OTHER PUBLICATIONS

Liu et al., CN108957478 (machine English translated version) (2018).*
(Continued)

*Primary Examiner* — Hyun D Park
(74) *Attorney, Agent, or Firm* — Kilpatrick Townsend & Stockton LLP

(57) ABSTRACT

A data fusion method is provided. In one embodiment, the method comprises: acquiring a rotation angle of a laser transmitter of a lidar; selecting, according to a predetermined correspondence between rotation angle intervals and image sensors, an image sensor corresponding to a rotation angle interval in which the obtained rotation angle of the laser emitter is located as a specified image sensor, sending a trigger signal to the specified image sensor, to enable the specified image sensor to acquire an image, receiving the image and a point cloud that is acquired and returned by the lidar within the rotation angle interval in which the obtained rotation angle is located, and fuse information of pixels in the image and information of points in the point cloud according to pose change information of a vehicle in a process of acquiring the image and the point cloud.

15 Claims, 4 Drawing Sheets

(51) Int. Cl.
  *G01S 17/86* (2020.01)
  *G01S 17/931* (2020.01)

(56) References Cited

U.S. PATENT DOCUMENTS

| | | | |
|---|---|---|---|
| 2018/0003822 A1 | 1/2018 | Li et al. | |
| 2018/0012370 A1* | 1/2018 | Aghamohammadi | G06F 18/251 |
| 2018/0372875 A1* | 12/2018 | Juelsgaard | G01S 17/931 |
| 2019/0258251 A1 | 8/2019 | Ditty et al. | |
| 2020/0174107 A1* | 6/2020 | Briggs | G06T 7/73 |
| 2021/0063200 A1* | 3/2021 | Kroepfl | C03C 17/3644 |

FOREIGN PATENT DOCUMENTS

| | | |
|---|---|---|
| CN | 106043169 A | 10/2016 |
| CN | 107071341 A | 8/2017 |
| CN | 107609522 A | 1/2018 |
| CN | 107703506 A | 2/2018 |
| CN | 107972585 A | 5/2018 |
| CN | 107991662 A | 5/2018 |
| CN | 108957478 A | 12/2018 |
| CN | 109816702 A | 5/2019 |
| CN | 109859154 A | 6/2019 |
| CN | 110275179 A | 9/2019 |
| CN | 111522026 A | 8/2020 |

OTHER PUBLICATIONS

ISA State Intellectual Property Office of the People's Republic of China, International Search Report Issued in Application No. PCT/CN2021/088652, Jul. 22, 2021, WIPO, 5 pages.

ISA State Intellectual Property Office of the People's Republic of China, Written Opinion of the International Searching Authority Issued in Application No. PCT/CN2021/088652, Jul. 22, 2021, WIPO, 7 pages. (Submitted with Machine/Partial Translation).

State Intellectual Property Office of the People's Republic of China, Office Action and Search Report Issued in Application No. 2020103161890, Aug. 2, 2022, 27 pages. (Submitted with Machine/Partial Translation).

European Patent Office, Extended European Search Report Issued in Application No. 21792770.6, May 26, 2023, Germany, 8 pages.

* cited by examiner

DATA FUSION

CROSS REFERENCE TO RELATED APPLICATIONS

This application is a US National Phase of a PCT Application No. PCT/CN2021/088652 filed on Apr. 21, 2021, which claims priority to Chinese Patent Application No. 202010316189.0 filed on Apr. 21, 2020, the entire contents of which are incorporated herein by reference in their entireties.

TECHNICAL FIELD

This disclosure relates to the technical field of computer technologies, and in particular, to data fusion.

BACKGROUND

Generally, for the same target, data acquired by different sensors can be fused to obtain new data, and the obtained new data can contain more abundant information.

Taking a self-driving field as an example, generally, an unmanned device may acquire image data with an image sensor and acquire point cloud data with a lidar. Image data has abundant color information. However, image data does not have relatively accurate depth information (that is, distance information). Point cloud data has accurate distance information. However, point cloud data does not have color information. Therefore, the unmanned device may obtain image data and point cloud data, and combine the advantages of image data and point cloud data to obtain data in which distance information and color information are fused, to facilitate the control of the unmanned device based on the data in which distance information and color information are fused.

SUMMARY

This disclosure provides a data fusion method, where the method is applied to a system, and the system includes a vehicle and a lidar and at least one image sensor that are arranged on the vehicle, the lidar is configured to acquire a point cloud by rotating a laser emitter, and the method includes:

obtaining a rotation angle of the laser emitter determined by a rotation angle measurer of the lidar;

selecting, according to a predetermined correspondence between at least one rotation angle interval and the at least one image sensor, an image sensor corresponding to a rotation angle interval in which the obtained rotation angle of the laser emitter is located as a specified image sensor, where for each of the at least one image sensor, a rotation angle interval corresponding to the image sensor is a value interval of the rotation angle of the laser emitter within an acquisition overlap region between the lidar and the image sensor;

sending a trigger signal to the specified image sensor, to enable the specified image sensor to acquire an image;

receiving the image and a point cloud that is acquired and returned by the lidar within the rotation angle interval in which the obtained rotation angle of the laser emitter is located; and fusing information of pixels in the image and information of points in the point cloud according to pose change information of the vehicle in a process of acquiring the image and the point cloud.

In some embodiments, sending the trigger signal to the specified image sensor includes:

using an image sensor corresponding to a rotation angle interval in which a rotation angle of the laser emitter obtained at a previous moment is located as a reference image sensor; and if the specified image sensor is not the reference image sensor, sending the trigger signal to the specified image sensor.

In some embodiments, fusing information of the pixels in the image and information of the points in the point cloud according to pose change information of the vehicle in the process of acquiring the image and the point cloud includes:

obtaining pose information of the vehicle when the image is acquired by the specified image sensor as benchmark pose information, and obtaining pose information of the vehicle when an acquisition for the point cloud is completed by the lidar within an acquisition overlap region corresponding to the specified image sensor as offset pose information;

determining compensatory pose information for the offset pose information according to the benchmark pose information; and fusing the information of the pixels in the image and the information of the points in the point cloud according to the compensatory pose information.

In some embodiments, fusing the information of the pixels in the image and the information of the points in the point cloud according to the compensatory pose information includes:

determining mapping parameter values according to the compensatory pose information and a relative position between the specified image sensor and the lidar; and fusing the information of the pixels in the image and the information of the points in the point cloud according to the mapping parameter values.

In some embodiments, fusing the information of the pixels in the image and the information of the points in the point cloud according to the mapping parameter values includes:

performing coordinate conversion on spatial position information of the points in the point cloud and/or the information of the pixels in the image according to the mapping parameter values; and for each point in the point cloud, determining a pixel in the image corresponding to the point according to a result of the coordinate conversion, and fusing the spatial position information of the point and a pixel value of the pixel in the image corresponding to the point to obtain fused data.

In some embodiments, the method is performed by a processor configured in the vehicle. The processor includes a field-programmable gate array (FPGA).

This disclosure provides a data fusion system, where the system includes a processor, a lidar, at least one image sensor, an inertial measurement unit (IMU), and a vehicle;

the vehicle is provided with the processor, the lidar, the at least one image sensor, and the IMU, where the lidar is configured to acquire a point cloud by rotating a laser emitter;

the processor is configured to: obtain a rotation angle of the laser emitter determined by a rotation angle measurer of the lidar, select, according to a predetermined correspondence between at least one rotation angle interval and the at least one image sensor, an image sensor corresponding to a rotation angle interval in which the obtained rotation angle of the laser emitter is located as a specified image sensor, where for each of the at least one image sensor, a rotation angle interval corresponding to the image sensor is a value interval of the rotation angle of the laser emitter within an acquisition overlap region between the lidar and the image sensor, send a trigger signal to the specified image sensor, to enable the specified image sensor to acquire an image, receive the image and a point cloud that is acquired and returned by the lidar within the rotation angle interval in which the obtained rotation angle of the laser emitter is located, and fuse information of a pixel in the image and information of a point in the point cloud according to pose change information of the vehicle in a process of acquiring the image and the point cloud;

the lidar is configured to acquire the point cloud and provide the processor with the rotation angle of the laser emitter determined by the rotation angle measurer of the lidar;

the at least one image sensor is configured to receive the trigger signal sent by the processor, and acquire and return the image according to the trigger signal; and the IMU is configured to acquire pose information of the vehicle.

This disclosure provides a data fusion apparatus, where a lidar and at least one image sensor are arranged on a vehicle in which the apparatus is located, the lidar is configured to acquire a point cloud by rotating a laser emitter, and the apparatus includes:

an obtaining module, configured to obtain a rotation angle of the laser emitter determined by a rotation angle measurer of the lidar;

a selection module, configured to select, according to a predetermined correspondence between at least one rotation angle interval and the at least one image sensor, an image sensor corresponding to a rotation angle interval in which the obtained rotation angle of the laser emitter is located as a specified image sensor, where for each of the at least one image sensor, a rotation angle interval corresponding to the image sensor is a value interval of the rotation angle of the laser emitter within an acquisition overlap region between the lidar and the image sensor;

a sending module, configured to send a trigger signal to the specified image sensor, to enable the specified image sensor to acquire an image;

a receiving module, configured to receive the image and a point cloud that is acquired and returned by the lidar within the rotation angle interval in which the obtained rotation angle of the laser emitter is located; and a fusion module, configured to fuse information of pixels in the image and information of points in the point cloud according to pose change information of the vehicle in a process of acquiring the image and the point cloud.

This disclosure provides a computer-readable storage medium, the storage medium storing a computer program, the computer program, when being executed by a processor, implements the foregoing data fusion method.

This disclosure provides an electronic device, including a memory, a processor, and a computer program stored in the memory and capable of being run on the processor, the processor, when executing the program, implementing the foregoing data fusion method.

At least one of the above technical solutions adopted in the embodiments of this disclosure can achieve the following beneficial effects:

In this disclosure, a vehicle is provided with a lidar and at least one image sensor. The lidar is configured to acquire a point cloud by rotating a laser emitter. A processor may obtain a rotation angle of the laser emitter determined by a rotation angle measurer of the lidar, select, according to a predetermined correspondence between at least one rotation angle interval and at least one image sensor, an image sensor corresponding to an interval in which the obtained rotation angle of the laser emitter is located as a specified image sensor, where for each of the at least one image sensor, a rotation angle interval corresponding to the image sensor is a value interval of the rotation angle of the laser emitter within an acquisition overlap region between the lidar and the image sensor, send a trigger signal to the specified image sensor, to enable the specified image sensor to acquire an image, receive the image and a point cloud that is acquired and returned by the lidar within the rotation angle interval in which the obtained rotation angle of the laser emitter is located, and fuse information of pixels in the image and information of points in the point cloud according to pose change information of the vehicle in a process of acquiring the image and the point cloud. In the data fusion method provided in this disclosure, when the value of the rotation angle of the laser emitter of the lidar belongs to the rotation angle interval corresponding to the acquisition overlap region between the lidar and the specified image sensor, the trigger signal is sent to the specified image sensor to enable the specified image sensor to acquire the image, and then information of the pixels in the image and information of the points in the point cloud are fused according to the pose change information of the vehicle in a process of acquiring the image and acquiring the point cloud, so that the fused data is more accurate.

DETAILED DESCRIPTION OF THE EMBODIMENTS

Figure 1:
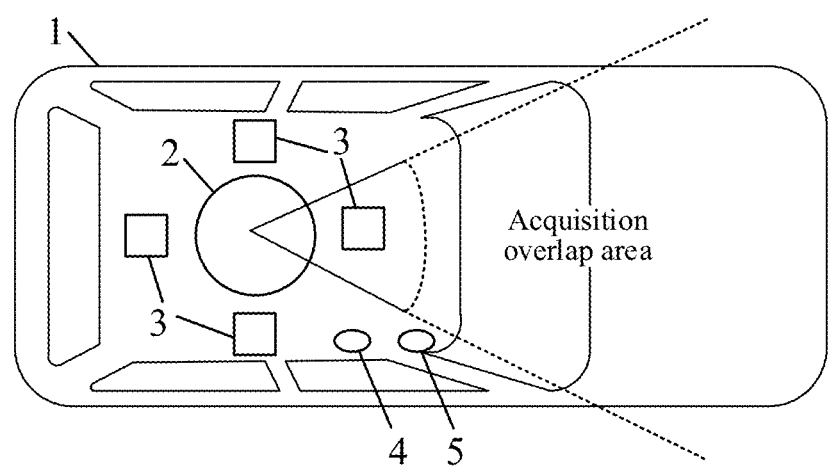
FIG. 1 is a schematic diagram of a data fusion system according to an embodiment of this disclosure.

To clearly state the objectives and advantages of this disclosure, this disclosure will be described below with reference to specific embodiments of this disclosure and corresponding accompanying drawings. Apparently, the described embodiments are merely some but not all of the embodiments of this disclosure. All other embodiments obtained by a person of ordinary skill in the art based on the embodiments of this disclosure without creative efforts fall within the protection scope of this disclosure.

The data fusion method provided in this disclosure mainly relates to the fusion of information of a pixel in an image acquired by an image sensor and information of a point in a point cloud acquired by a lidar. The information of the pixel in the image may include abundant color information. The color information may be determined according to a pixel value of the pixel. For example, the color information may be represented by an RGB color mode. A value range of the pixel value is [0, 255]. The information of the point in the point cloud may include accurate distance information, reflection strength information, and the like. The distance information may be determined according to spatial position information of the point in the point cloud. Therefore, the information of the pixel in the image and the information of the point in the point cloud may be fused to obtain fused data. The fused data has abundant color information and accurate distance information, reflection strength information, and the like.

The data fusion method provided in this disclosure may be widely applied to various scenarios. For example, the data fusion method provided in this disclosure may be applied to a self-driving scenario. Specifically, an unmanned device may fuse information of a pixel in an image acquired by an image sensor and information of a point in a point cloud acquired by a lidar to obtain fused data, to control the unmanned device according to the fused data. Taking trajectory planning of the unmanned device as an example, the unmanned device may perform image segmentation and other processing on the fused data, detect an obstacle in a surrounding environment of the unmanned device, and plan a trajectory for the unmanned device according to information of the obstacle.

In another example, the data fusion method provided in this disclosure may be applied to a scenario of generating a high-precision map. Specifically, a processor may fuse information of a pixel in an image acquired by an image sensor equipped on a vehicle and information of a point in a point cloud acquired by an equipped lidar to obtain fused data, determine semantic information of the fused data, and generate a more accurate high-precision map according to the semantic information of the fused data.

In still another example, the data fusion method provided in this disclosure may be applied to a scenario of training a machine learning model. Specifically, a processor may fuse information of a pixel in an image acquired by an image sensor and information of a point in a point cloud acquired by a lidar to obtain fused data, and perform training with the fused data as a training sample. Compared with separate use of image data or point cloud data, the use of the fused data increases the feature dimensionality of a training sample, so that the effect of training a machine learning model is better.

The following describes the embodiments of this disclosure in detail with reference to the accompanying drawings.

FIG. 1 is a schematic diagram of a data fusion system according to an embodiment of this disclosure. In FIG. 1, the data fusion system includes a vehicle 1, a lidar 2, a plurality of image sensors 3, an Inertial Measurement Unit (IMU) 4, and a processor 5. The vehicle 1 may be an unmanned device such as a self-driving car or may be an ordinary vehicle. Certainly, although taking a vehicle as an example here, the vehicle 1 may also be an aircraft such as an unmanned aerial vehicle. The lidar 2 may be a mechanical lidar. The lidar 2 may acquire a point cloud in a manner of rotating a laser emitter. An acquisition region of the lidar 2 and an acquisition region of each image sensor 3 may overlap. The lidar 2 may acquire a panoramic point cloud, therefore, the lidar 2 and the plurality of image sensors 3 may be mounted at the top of the vehicle 1. FIG. 1 is a schematic diagram of mounting positions. For each image sensor 3, an overlap region between the acquisition region of the lidar 2 and the acquisition region of the image sensor 3 is used as an acquisition overlap region corresponding to the image sensor 3, that is, the acquisition overlap region between the lidar 2 and the image sensor 3. For example, a semi-closed region defined by dash lines in FIG. 1 is an acquisition overlap region between the lidar 2 and the image sensor 3 on the right side. The IMU 4 and the processor 5 may be mounted at the top of the vehicle 1 or other positions of the vehicle 1.

The lidar 2 may include a laser emitter, a rotation angle measurer, a motor, and the like (not shown in FIG. 1). The lidar 2 may implement the function of acquiring a panoramic point cloud in a manner of rotating a laser emitter. When acquiring a point cloud, the lidar 2 may determine a rotation angle of the laser emitter with the rotation angle measurer (that is, a photoelectric code disk in the mechanical lidar), to provide the rotation angle of the laser emitter to the processor 5 in real time.

The image sensor 3 may receive a trigger signal sent by the processor 5, acquire an image according to the trigger signal, and send the acquired image to the processor 5. For data acquisition in the acquisition overlap region, an acquisition time for acquiring an image by the image sensor 3 is much shorter than an acquisition time required for the lidar 2 to acquire a point cloud by rotating the laser emitter through the motor. Therefore, the acquisition time of acquiring an image by the image sensor 3 may be omitted.

The IMU 4 may acquire pose information of a vehicle in real time. Amounting position of the IMU 4 on the vehicle 1 may be determined according to an actual case. The pose information may include displacement information of the vehicle, deviation angle information of the vehicle, and the like.

The processor 5 may include a Field Programmable Gate Array (FPGA), an application-specific integrated circuit (ASIC), a central processing unit (CPU), and the like. With a delay on a nanosecond (ns) level, the FPGA has a good synchronization effect. Therefore, the processor 5 may be an FPGA. The processor 5 may fuse information of a point in a point cloud acquired by the lidar 2 and information of a pixel in an image acquired by the image sensor 3.

Specifically, the processor 5 may first obtain the rotation angle of the laser emitter determined by the rotation angle measurer of the lidar 2, and next select, according to a predetermined correspondence between rotation angle intervals and image sensors 3, an image sensor 3 corresponding to a rotation angle interval in which the obtained rotation angle of the laser emitter is located, as a specified image sensor 3, where for each image sensor 3, a rotation angle interval corresponding to the image sensor 3 is a value interval of the rotation angle of the laser emitter within an acquisition overlap region between the lidar 2 and the image sensor 3. Subsequently, the processor 5 may send a trigger signal to the specified image sensor 3, to enable the specified image sensor 3 to acquire an image, and receive the acquired image and a point cloud that is acquired and returned by the lidar 2 within the rotation angle interval in which the rotation angle of the laser emitter is located, and may finally fuse information of a pixel in the image and information of a point in the point cloud according to pose change information of the vehicle 1 in a process of acquiring the image and the point cloud.

Figure 2:
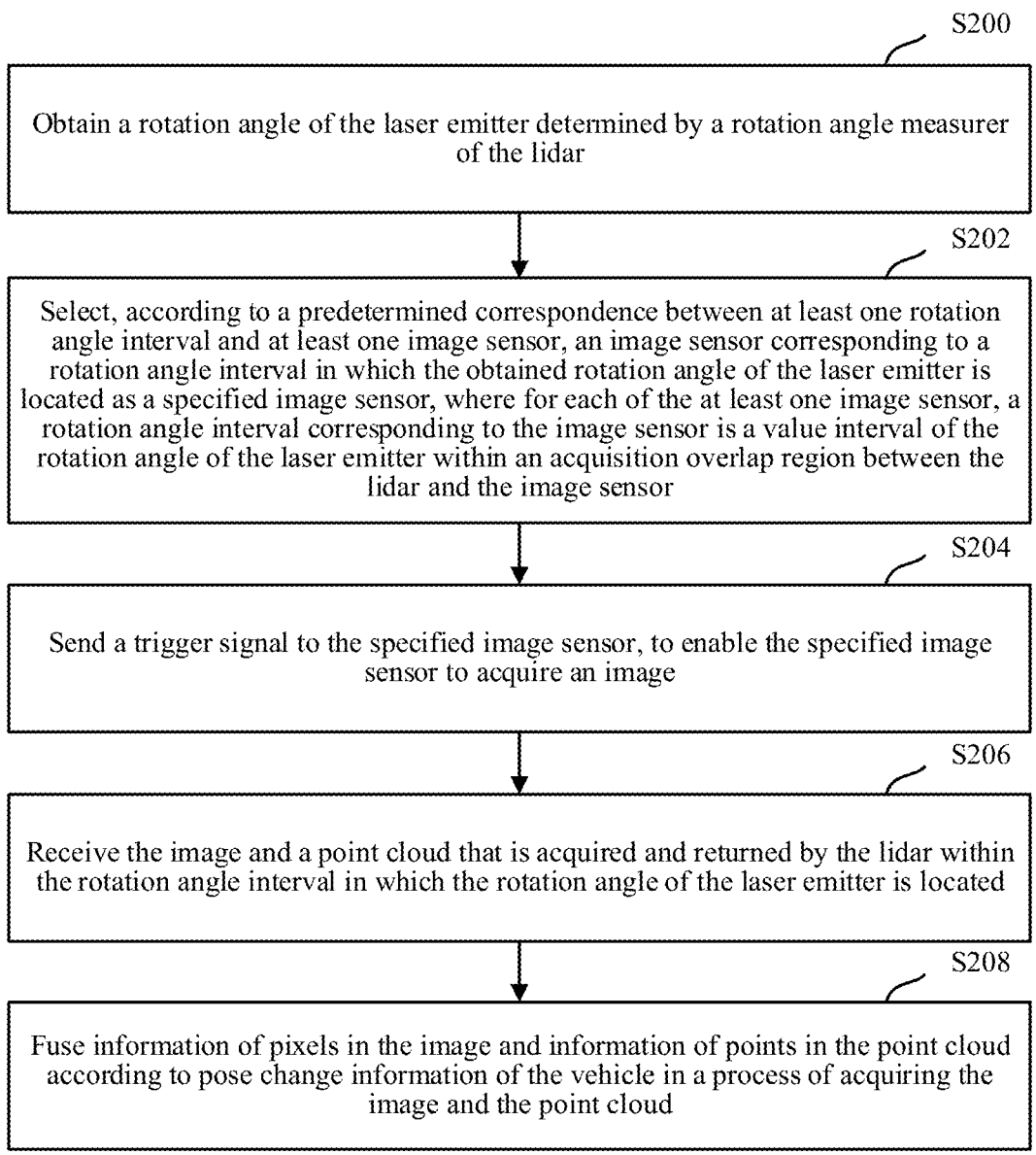
FIG. 2 is a flowchart of a data fusion method according to an embodiment of this disclosure.

A process of a method for fusing, by the processor 5, information of a point in a point cloud acquired by the lidar 2 and information of a pixel in an image acquired by the image sensor 3 may be shown in FIG. 2.

FIG. 2 is a flowchart of a data fusion method according to an embodiment of this disclosure. The method may include steps S200 to S208.

S200: A processor obtains a rotation angle of the laser emitter determined by a rotation angle measurer of the lidar.

In this disclosure, the lidar is configured to acquire a point cloud in real time in a manner of rotating a laser emitter. Therefore, the rotation angle measurer arranged inside the lidar may determine the rotation angle of the laser emitter in real time. The lidar may be a mechanical lidar, and the rotation angle measurer may be referred to as a photoelectric code disk.

The processor may be an FPGA, so that it is ensured, with a relatively short delay, that the time of acquiring an image by the image sensor is synchronous with the time at which the laser emitter is rotated to an edge of an acquisition overlap region corresponding to the image sensor. The processor may obtain in real time the rotation angle of the laser emitter determined by the rotation angle measurer.

S202: Select, according to a predetermined correspondence between rotation angle intervals and image sensors, an image sensor corresponding to a rotation angle interval in which the obtained rotation angle of the laser emitter is located as a specified image sensor, where for each image sensor, a rotation angle interval corresponding to the image sensor is a value interval of the rotation angle of the laser emitter within an acquisition overlap region between the lidar and the image sensor.

In this disclosure, the processor may predetermine the correspondence between rotation angle intervals and image sensors. Specifically, first, the processor may set a sequence number (that is, an image sensor identifier) for each image sensor in advance. Next, for each image sensor, the processor may determine the overlap region between the acquisition region of the image sensor and the acquisition region of the lidar as the acquisition overlap region corresponding to the image sensor. That is, the processor may determine a correspondence between image sensor identifiers and acquisition overlap regions. Finally, a value interval of the rotation angle of the laser emitter within an acquisition overlap region corresponding to each image sensor is used as a rotation angle interval. The processor may determine the correspondence between rotation angle intervals and image sensors. That is, the processor may determine a correspondence among an image sensor identifier, a rotation angle interval, and an acquisition overlap region.

Figure 3:
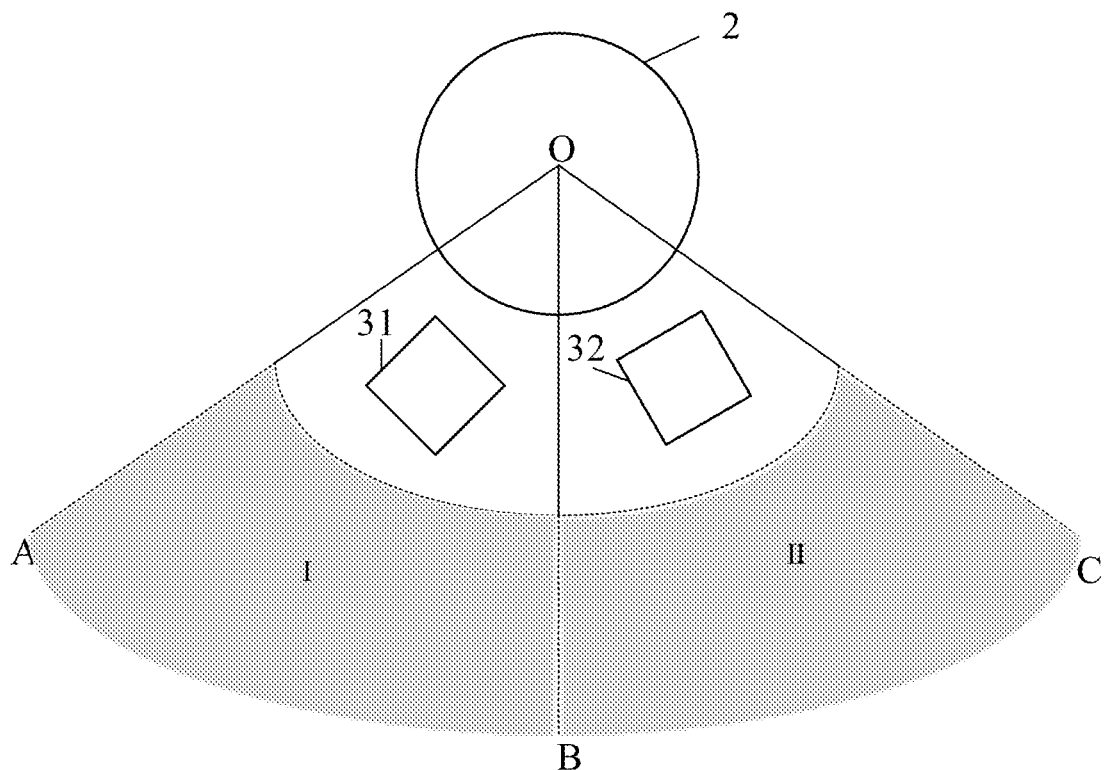
FIG. 3 is a schematic diagram of acquisition overlap regions between acquisition regions of a plurality of image sensors and an acquisition region of a lidar according to an embodiment of this disclosure.

FIG. 3 is a schematic diagram of overlap regions between acquisition regions of a plurality of image sensors and an acquisition region of a lidar according to an embodiment of this disclosure. As shown in FIGS. 3, 31 and 32 are two image sensors. Two image sensor identifiers may be respectively denoted as 31 and 32. A point O is the position from which a laser beam is emitted from the lidar. A semi-closed region part I (indicated by dash lines and a shade) defined by a straight line OA and a straight line OB is an overlap region between an acquisition region of the image sensor 31 and an acquisition region of the lidar, and a semi-closed region part II (indicated by dash lines and a shade) defined by the straight line OB and a straight line OC is an overlap region between an acquisition region of the image sensor 32 and the acquisition region of the lidar. The lidar emits a laser beam in a manner of rotating the laser emitter. Therefore, a rotation direction may be a clockwise direction or a counterclockwise direction. For ease of description, in the following content, the rotation direction is the counterclockwise direction.

As can be seen from FIG. 3, the straight line OA and the straight line OB form two edges of an acquisition overlap region corresponding to the image sensor 31, and the straight line OB and the straight line OC form two edges of an acquisition overlap region corresponding to the image sensor 32. If it is calibrated in advance that a value range of the rotation angle of the laser emitter within the acquisition overlap region corresponding to the image sensor 31 is 45° to 90° and a value range of the rotation angle of the laser emitter within the acquisition overlap region corresponding to the image sensor 32 is 90° to 135°, because the rotation direction is the counterclockwise direction, it may be considered that a rotation angle interval corresponding to the image sensor 31 is [45°,90°), and it may be considered that a rotation angle interval corresponding to the image sensor 32 is [90°,135°).

Further, in addition to predetermining the correspondence between rotation angle intervals and image sensors, the processor may calibrate mounting positions of the lidar, the image sensors, and the IMU in advance. In addition, the processor may further calibrate parameters of the image sensors in advance. The parameters of each image sensor may include an intrinsic parameter, an extrinsic parameter, a distortion coefficient, and the like. A calibration process for the mounting positions of the lidar, the image sensors, and the IMU and a calibration process for the parameters of the image sensors are not described in details again.

After obtaining the rotation angle of the laser emitter determined by the rotation angle measurer of the lidar, the processor may determine a rotation angle interval in which the obtained rotation angle of the laser emitter is located. A specified image sensor may be selected from the image sensors according to a rotation angle interval in which the obtained rotation angle of the laser emitter is located and the correspondence between rotation angle intervals and image sensors. That is, when the value of the obtained rotation angle of the laser emitter belongs to a rotation angle interval corresponding to an image sensor, the image sensor may be used as the specified image sensor. Following the example in FIG. 3, when the value of the obtained rotation angle of the laser emitter is 45° or is any value belonging to [45°, 90°), the image sensor 31 may be selected as the specified image sensor.

S204: Send a trigger signal to the specified image sensor, to enable the specified image sensor to acquire an image.

After the specified image sensor is selected, the processor may send a trigger signal to the specified image sensor. After receiving the trigger signal sent by the processor, the specified image sensor may acquire an image. An image acquisition region of the specified image sensor includes an acquisition overlap region corresponding to the specified image sensor. Following the foregoing example in FIG. 3, after receiving the trigger signal, the image sensor 31 acquires an image of a dash-line region part defined by the straight line OA and the straight line OB.

Specifically, when a laser beam emitted by the lidar is within the acquisition overlap region corresponding to the specified image sensor, the processor may send a trigger signal to the specified image sensor, and does not need to repeatedly send a trigger signal. The processor may use an image sensor corresponding to a rotation angle interval in which a rotation angle of the laser emitter obtained at a previous moment is located as a reference image sensor, and at the same time, determine whether the specified image sensor is the reference image sensor. If a determination result is yes, it indicates that the processor has sent a trigger signal to the specified image sensor at a previous moment, and does not need to send a trigger signal to the specified image sensor again at a current moment. If a determination result is no, it indicates that the processor has not sent a trigger signal to the specified image sensor at a previous moment and the specified image sensor has not acquired an image. The processor may send a trigger signal to the specified image sensor to enable the specified image sensor to acquire an image after receiving the trigger signal.

Certainly, the processor may further determine whether the rotation angle of the laser emitter is a value of an start point of the rotation angle interval corresponding to the specified image sensor. If a determination result is yes, it indicates that a laser beam emitted by the laser emitter overlaps an edge of the acquisition overlap region corresponding to the specified image sensor, and the processor may send a trigger signal to the specified image sensor. If a determination result is no, it indicates that the processor has sent a trigger signal to the specified image sensor and does not need to send a trigger signal again.

S206: Receive the image and a point cloud that is acquired and returned by the lidar within the rotation angle interval in which the rotation angle of the laser emitter is located.

After the processor sends the trigger signal to the specified image sensor, the specified image sensor may acquire an image according to the received trigger signal, and send the acquired image to the processor. The processor may receive the image sent by the specified image sensor. Because the lidar is located in the acquisition overlap region corresponding to the specified image sensor, a relatively long acquisition time is required to acquire a point cloud in a manner of physically rotating a laser emitter. Therefore, when a laser beam emitted by the lidar overlaps one edge of the acquisition overlap region corresponding to the specified image sensor, the specified image sensor acquires an image, and the lidar continues to acquire a point cloud. When the laser beam emitted by the lidar overlaps the other edge of the acquisition overlap region corresponding to the specified image sensor, the processor may receive a point cloud that is acquired and returned by the lidar within the rotation angle interval in which the rotation angle of the laser emitter is located.

Following the foregoing example in FIG. 3, when the obtained rotation angle of the laser emitter is 45°, the processor may send a trigger signal to the image sensor 31. The image sensor 31 acquires an image according to the trigger signal. The processor receives an image sent by the image sensor 31. The lidar continues to acquire a point cloud in the acquisition overlap region corresponding to the image sensor 31. When the rotation angle of the laser emitter is 90° or greater than 90°, it indicates that the lidar has completed acquisition for a point cloud in the acquisition overlap region corresponding to the image sensor 31, and sends the point cloud acquired in the acquisition overlap region corresponding to the image sensor 31 to the processor.

S208: Fuse information of a pixel in the image and information of a point in the point cloud according to pose change information of the vehicle in a process of acquiring the image and the point cloud.

After receiving the image acquired and returned by the specified image sensor and the point cloud acquired by the lidar in the acquisition overlap region corresponding to the image sensor, the processor may fuse information of a pixel in the image and information of a point in the point cloud according to pose information of the vehicle acquired by the IMU.

Specifically, first, the IMU may acquire the pose information of the vehicle in real time. Therefore, the processor may use the pose information of the vehicle acquired by the IMU during the acquisition for the image by the specified image sensor as benchmark pose information and the pose information of the vehicle acquired by the IMU at completion of the acquisition for the point cloud by the lidar within an acquisition overlap region corresponding to the specified image sensor as offset pose information. Following the foregoing example in FIG. 3, the processor may use pose information of the vehicle acquired by the IMU when the rotation angle of the laser emitter is 45° as the benchmark pose information, and use pose information of the vehicle acquired by the IMU when the rotation angle of the laser emitter is 90° as the offset pose information.

Next, the processor may determine compensatory pose information for the offset pose information according to the benchmark pose information. Specifically, the pose information may include displacement information of the vehicle, deviation angle information of the vehicle, and the like. Therefore, a difference value between the offset pose information and the benchmark pose information may be used as the compensatory pose information for the offset pose information. For example, when the vehicle travels along a straight line, a difference between the benchmark pose information and the offset pose information acquired by the IMU is 1 measurer. The compensatory pose information may include information such as a displacement of 1 measurer, a deviation angle of 0°, and the like.

Subsequently, the processor may determine mapping parameter values according to the compensatory pose information and a relative position between the specified image sensor and the lidar. Specifically, the processor may compensate for the pose information of the vehicle during acquisition for a point cloud by the lidar according to the compensatory pose information, to ensure that pose information of the vehicle during acquisition for points in a point cloud by the lidar is the same as the pose information of the vehicle during the acquisition for the image by the specified image sensor. The mapping parameter values are determined according to a pose information of the vehicle during acquisition for the point cloud by the lidar after compensation and a relative position between the specified image sensor and the lidar calibrated in advance.

Finally, the processor may fuse the information of the pixel in the image and the information of the point in the point cloud according to the mapping parameter values. Specifically, the processor may perform coordinate conversion on spatial position information of the point in the point cloud and/or the information of the pixel in the image according to the mapping parameter values. For each point in the point cloud, a pixel in the image corresponding to the point is determined according to a result of the coordinate conversion, and the spatial position information of the point and a pixel value of the pixel in the image corresponding to the point are fused to obtain fused data.

For each point in the point cloud, the processor may perform coordinate conversion on spatial position information of the point in the point cloud according to the mapping parameter values. After coordinate conversion, a mapping position of the point in the point cloud in an image is obtained, and a pixel located at the mapping position in the image is used as a pixel in the image corresponding to the point in the point cloud. In addition, for each pixel in the image, the processor may perform coordinate conversion on information of the pixel according to the mapping parameter values to obtain a mapping position of the pixel in the point cloud, and use a point located at the mapping position in the point cloud as a point in the point cloud corresponding to the pixel. Certainly, the processor may establish a world coordinate system with the vehicle as the center, and perform coordinate conversion on spatial position information of each point in a point cloud and information of each pixel in an image according to the mapping parameter values to obtain position information of the point in the point cloud in the world coordinate system and position information of each pixel in the image in the world coordinate system. Spatial position information of a point in the point cloud and a pixel value of a pixel in the image at the same position in the world coordinate system may be fused to obtain fused data.

The foregoing data fusion method provided in this disclosure may be applied to fields of delivery using an unmanned device, for example, a scenario of delivery such as a courier service or food delivery using an unmanned device. Specifically, in the foregoing scenario, a self-driving fleet formed by a plurality of unmanned devices may be used for delivery.

Figure 4:
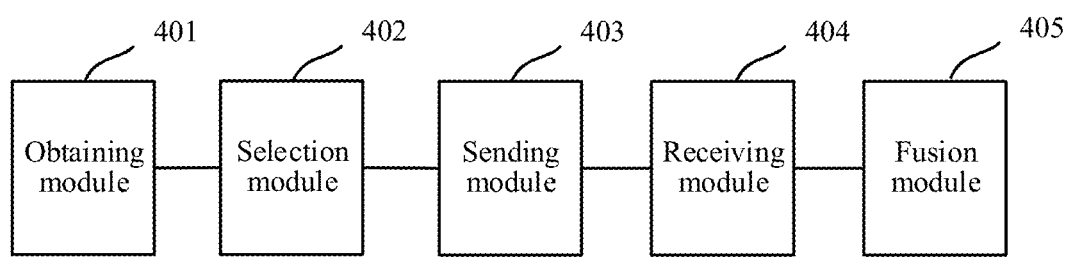
FIG. 4 is a schematic structural diagram of a data fusion apparatus according to an embodiment of this disclosure.

Based on the data fusion method shown in FIG. 2, an embodiment of this disclosure further correspondingly provides a schematic structural diagram of a data fusion apparatus, as shown in FIG. 4.

FIG. 4 is a schematic structural diagram of a data fusion apparatus according to an embodiment of this disclosure. A lidar and at least one image sensor are arranged on a vehicle in which the apparatus is located, the lidar is configured to acquire a point cloud by rotating a laser emitter, and the apparatus includes:

an obtaining module 401, configured to obtain a rotation angle of the laser emitter determined by a rotation angle measurer of the lidar;

a selection module 402, configured to select, according to a predetermined correspondence between at least one rotation angle interval and the at least one image sensor, an image sensor corresponding to a rotation angle interval in which the obtained rotation angle of the laser emitter is located as a specified image sensor, where for each of the at least one image sensor, a rotation angle interval corresponding to the image sensor is a value interval of the rotation angle of the laser emitter within an acquisition overlap region between the lidar and the image sensor;

a sending module 403, configured to send a trigger signal to the specified image sensor, to enable the specified image sensor to acquire an image;

a receiving module 404, configured to receive the image and a point cloud that is acquired and returned by the lidar within the rotation angle interval in which the obtained rotation angle of the laser emitter is located; and a fusion module 405, configured to fuse information of pixels in the image and information of points in the point cloud according to pose change information of the vehicle in a process of acquiring the image and the point cloud.

In some embodiments, the sending module 403 is configured to use an image sensor corresponding to a rotation angle interval in which a rotation angle of the laser emitter obtained at a previous moment is located as a reference image sensor; and if the specified image sensor is not the reference image sensor, send the trigger signal to the specified image sensor.

In some embodiments, the fusion module 405 is configured to: obtain pose information of the vehicle when the image is acquired by the specified image sensor as benchmark pose information, and obtaining pose information of the vehicle when an acquisition for the point cloud is completed by the lidar within an acquisition overlap region corresponding to the specified image sensor as offset pose information; determine compensatory pose information for the offset pose information according to the benchmark pose information; and fuse the information of the pixels in the image and the information of the points in the point cloud according to the compensatory pose information.

In some embodiments, the fusion module 405 is configured to: determine mapping parameter values according to the compensatory pose information and a relative position between the specified image sensor and the lidar; and fuse the information of the pixels in the image and the information of the points in the point cloud according to the mapping parameter values.

In some embodiments, the fusion module 405 is configured to perform coordinate conversion on spatial position information of the points in the point cloud and/or the information of the pixels in the image according to the mapping parameter values; and for each point in the point cloud, determine a pixel in the image corresponding to the point according to a result of the coordinate conversion, and fuse the spatial position information of the point and a pixel value of the pixel in the image corresponding to the point to obtain fused data.

In some embodiments, the processor includes an FPGA.

The embodiments of this disclosure further provide a computer-readable storage medium, storing a computer program. The computer program may be used for performing the foregoing data fusion method provided in FIG. 2.

Figure 5:
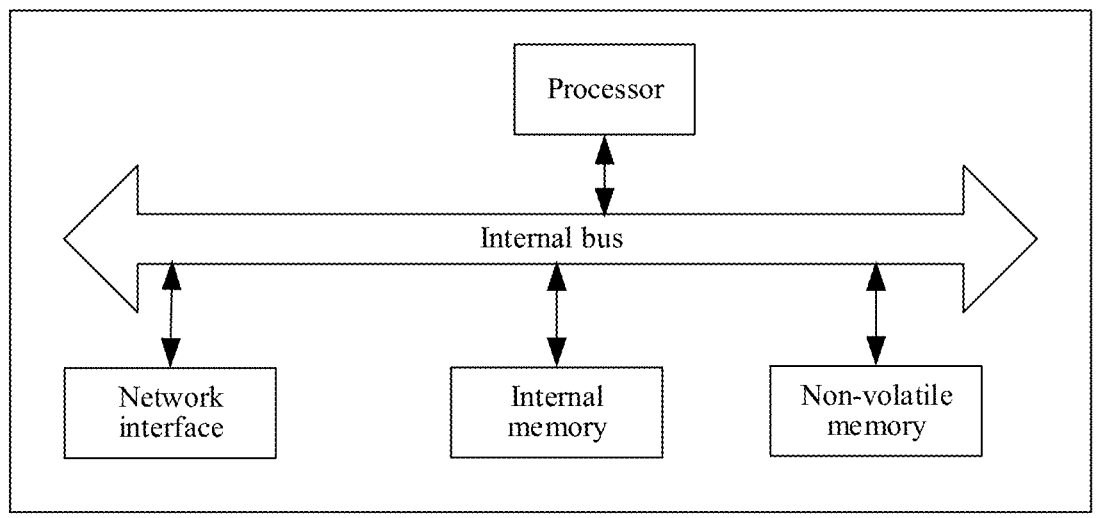
FIG. 5 is a schematic diagram of an electronic device corresponding to FIG. 1 according to an embodiment of this disclosure.

Based on the data fusion method shown in FIG. 2, the embodiments of this disclosure further provide a schematic structural diagram of an electronic device shown in FIG. 5. Referring to FIG. 5, at a hardware aspect, the electronic device includes a processor, an internal bus, a network interface, an internal memory, and a non-volatile memory, and may certainly further include hardware required for other functions. The processor reads a corresponding computer program from the non-volatile storage into the memory and then runs the computer program to implement the foregoing data fusion method shown in FIG. 2.

Definitely, in addition to a software implementation, this disclosure does not exclude other implementations, for example, a logic device or a combination of software and hardware. In other words, an entity executing the foregoing processing procedure is not limited to the logic units, and may be hardware or logic devices.

In the 1990s, improvements of a technology can be clearly distinguished between hardware improvements (for example, improvements to a circuit structure such as a diode, a transistor, or a switch) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as an FPGA is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The processor can be implemented in any suitable manner, for example, the processor can take the form of, for example, a microprocessor and a computer-readable medium storing computer-readable program code (for example, software or firmware) executable by the processor, a logic gate, a switch, an ASIC, a programmable logic controller and an embedded microcontroller. Examples of the processor include, but are not limited to, the following microcontrollers: ARC 625D, Atmel AT91SAM, Microchip PIC18F26K20, and Silicone Labs C8051F320. A person skilled in the art will also appreciate that, in addition to implementing the processor in the form of pure computer-readable program code, it is also completely possible to implement, by logically programming the method steps, the processor in the form of a logic gate, switch, ASIC, programmable logic controller, and embedded microcontroller and other forms to achieve the same function. Such a processor can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be implemented by a computer chip or an entity, or implemented by a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in the implementation of this disclosure, the functions of the units may be implemented in the same piece of or a plurality of pieces of software and/or hardware.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to the embodiments of this disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computing device includes one or more processors (CPUs), an input/output interface, a network interface, and a memory.

The memory may include a form such as a volatile memory, a random access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer include, but are not limited to, a phase change memory (PRAM), a static random access memory (SRAM), a dynamic random access memory (DRAM), or other types of random access memory (RAM), a ROM, an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device. Based on the definition in this disclosure, the computer-readable medium does not include transitory computer-readable media (transitory media), such as a modulated data signal and a carrier.

It should also be noted that the terms "include", "comprise", and any other variants mean to cover the non-exclusive inclusion. Thereby, the process, method, article, or device that includes a series of elements not only include those elements, but also include other elements not clearly listed, or include the inherent elements of the process, method, article and device. Without further limitation, the element defined by a phrase "include one" does not exclude other same elements in the process, method, article or device which include the element.

This disclosure can be described in the general context of computer-executable instructions executed by a computer, for example, program modules. Generally, the program module includes a routine, a program, an object, a component, a data structure, and the like for executing a particular task or implementing a particular abstract data type. This disclosure may be implemented in a distributed computing environment in which tasks are performed by remote processing devices connected by using a communication network. In a distributed computing environment, the program module may be located in both local and remote computer storage media including storage devices.

The embodiments of this disclosure are all described in a progressive manner, for same or similar parts in the embodiments, refer to such embodiments, and descriptions of each embodiment focus on a difference from other embodiments. Especially, a system embodiment is basically similar to a method embodiment, and therefore is described briefly; for related parts, reference may be made to partial descriptions in the method embodiment.

The descriptions are merely embodiments of this disclosure, and are not intended to limit this disclosure. For a person skilled in the art, various modifications and changes may be made to this disclosure. Any modifications, equivalent replacements, and improvements made within the spirit and principle of this disclosure shall fall within the scope of this disclosure.

The invention claimed is:

1. A data fusion method, wherein the method is applied to a system, and the system comprises a vehicle, and a lidar and at least one image sensor that are arranged on the vehicle, the lidar is configured to acquire a point cloud by rotating a laser emitter, and the method comprises:
obtaining a rotation angle of the laser emitter determined by a rotation angle measurer of the lidar;
selecting, according to a predetermined correspondence between at least one rotation angle interval and the at least one image sensor, an image sensor corresponding to a rotation angle interval in which the obtained rotation angle of the laser emitter is located as a specified image sensor, wherein for each of the at least one image sensor, a rotation angle interval corresponding to the image sensor is a value interval of the rotation angle of the laser emitter within an acquisition overlap region between the lidar and the image sensor;
sending a trigger signal to the specified image sensor, to enable the specified image sensor to acquire an image;
receiving the image and a point cloud that is acquired and returned by the lidar within the rotation angle interval in which the obtained rotation angle of the laser emitter is located; and
fusing information of pixels in the image and information of points in the point cloud according to pose change information of the vehicle in a process of acquiring the image and the point cloud, for unmanned device self-driving or high-precision map generation;
wherein fusing the information of the pixels in the image and information of the points in the point cloud according to pose change information of the vehicle in the process of acquiring the image and the point cloud comprises:
obtaining pose information of the vehicle when the image is acquired by the specified image sensor as benchmark pose information, and obtaining pose information of the vehicle when an acquisition for the point cloud is completed by the lidar within an acquisition overlap region corresponding to the specified image sensor as offset pose information;
determining compensatory pose information for the offset pose information according to the benchmark pose information;
fusing the information of the pixels in the image and the information of the points in the point cloud according to the compensatory pose information; and
controlling the unmanned device according to the fused information according to the compensatory pose information.

2. The method according to claim 1, wherein sending the trigger signal to the specified image sensor comprises:
using an image sensor corresponding to a rotation angle interval in which a rotation angle of the laser emitter obtained at a previous moment is located as a reference image sensor; and
in response to determining that the specified image sensor is not the reference image sensor, sending the trigger signal to the specified image sensor.

3. The method according to claim 1, wherein fusing the information of the pixels in the image and the information of the points in the point cloud according to the compensatory pose information comprises:
determining mapping parameter values according to the compensatory pose information and a relative position between the specified image sensor and the lidar; and
fusing the information of the pixels in the image and the information of the points in the point cloud according to the mapping parameter values.

4. The method according to claim 3, wherein fusing the information of the pixels in the image and the information of the points in the point cloud according to the mapping parameter values comprises:
performing coordinate conversion on spatial position information of the points in the point cloud and/or the information of the pixels in the image according to the mapping parameter values; and
for each point in the point cloud, determining a pixel in the image corresponding to the point according to a result of the coordinate conversion, and fusing the spatial position information of the point and a pixel value of the pixel in the image corresponding to the point to obtain fused data.

5. The method according to claim 1, wherein the method is performed by a processor configured in the vehicle, and the processor comprises a field-programmable gate array (FPGA).

6. A data fusion system, wherein the system comprises a processor, a lidar, at least one image sensor, an inertial measurement unit (IMU), and a vehicle;
the vehicle is provided with the processor, the lidar, the at least one image sensor, and the IMU, wherein the lidar is configured to acquire a point cloud by rotating a laser emitter;
the processor is configured to: obtain a rotation angle of the laser emitter determined by a rotation angle measurer of the lidar, select, according to a predetermined correspondence between at least one rotation angle interval and the at least one image sensor, an image sensor corresponding to a rotation angle interval in which the obtained rotation angle of the laser emitter is located as a specified image sensor, wherein for each of the at least one image sensor, a rotation angle interval corresponding to the image sensor is a value interval of the rotation angle of the laser emitter within an acquisition overlap region between the lidar and the image sensor, send a trigger signal to the specified image sensor, to enable the specified image sensor to acquire an image, receive the image and a point cloud that is acquired and returned by the lidar within the rotation angle interval in which the obtained rotation angle of the laser emitter is located, and fuse information of pixels in the image and information of points in the point cloud according to pose change information of the vehicle in a process of acquiring the image and the point cloud, for unmanned device self-driving or high-precision map generation;

the lidar is configured to acquire the point cloud and provide the processor with the rotation angle of the laser emitter determined by the rotation angle measurer of the lidar;

the at least one image sensor is configured to receive the trigger signal sent by the processor, and acquire and return the image according to the trigger signal; and the IMU is configured to acquire pose information of the vehicle; and, wherein, when fusing information of the pixels in the image and information of the points in the point cloud according to pose change information of the vehicle in the process of acquiring the image and the point cloud, the processor is further configured to:

obtain pose information of the vehicle when the image is acquired by the specified image sensor as benchmark pose information, and obtain pose information of the vehicle when an acquisition for the point cloud is completed by the lidar within an acquisition overlap region corresponding to the specified image sensor as offset pose information;

determine compensatory pose information for the offset pose information according to the benchmark pose information;

fuse the information of the pixels in the image and the information of the points in the point cloud according to the compensatory pose information; and control the unmanned device according to the fused information according to the compensatory pose information.

7. The data fusion system according to claim 6, wherein, when sending the trigger signal to the specified image sensor, the processor is further configured to:

use an image sensor corresponding to a rotation angle interval in which a rotation angle of the laser emitter obtained at a previous moment is located as a reference image sensor; and in response to determining that the specified image sensor is not the reference image sensor, send the trigger signal to the specified image sensor.

8. The data fusion system according to claim 6, wherein, when fusing the information of the pixels in the image and the information of the points in the point cloud according to the compensatory pose information, the processor is further configured to:

determine mapping parameter values according to the compensatory pose information and a relative position between the specified image sensor and the lidar; and fuse the information of the pixels in the image and the information of the points in the point cloud according to the mapping parameter values.

9. The storage medium according to claim 8, wherein fusing the information of the pixels in the image and the information of the points in the point cloud according to the mapping parameter values comprises:

performing coordinate conversion on spatial position information of the points in the point cloud and/or the information of the pixels in the image according to the mapping parameter values; and for each point in the point cloud, determining a pixel in the image corresponding to the point according to a result of the coordinate conversion, and fusing the spatial position information of the point and a pixel value of the pixel in the image corresponding to the point to obtain fused data.

10. The data fusion system according to claim 6, wherein, when fusing the information of the pixels in the image and the information of the points in the point cloud according to the mapping parameter values, the processor is further configured to:

perform coordinate conversion on spatial position information of the points in the point cloud and/or the information of the pixels in the image according to the mapping parameter values; and for each point in the point cloud, determine a pixel in the image corresponding to the point according to a result of the coordinate conversion, and fuse the spatial position information of the point and a pixel value of the pixel in the image corresponding to the point to obtain fused data.

11. The system according to claim 6, the processor comprises a field-programmable gate array (FPGA).

12. A non-transitory computer-readable storage medium storing a computer program, the computer program, when being executed by a processor, implements operations comprising:

obtaining a rotation angle of a laser emitter determined by a rotation angle measurer of a lidar;

selecting, according to a predetermined correspondence between at least one rotation angle interval and at least one image sensor, an image sensor corresponding to a rotation angle interval in which the obtained rotation angle of the laser emitter is located as a specified image sensor, wherein for each of the at least one image sensor, a rotation angle interval corresponding to the image sensor is a value interval of the rotation angle of the laser emitter within an acquisition overlap region between the lidar and the image sensor;

sending a trigger signal to the specified image sensor, to enable the specified image sensor to acquire an image;

receiving the image and a point cloud that is acquired and returned by the lidar within the rotation angle interval in which the obtained rotation angle of the laser emitter is located; and fusing information of pixels in the image and information of points in the point cloud according to pose change information of a vehicle in a process of acquiring the image and the point cloud, for unmanned device self-driving or high-precision map generation; and, wherein fusing the information of the pixels in the image and information of the points in the point cloud according to pose change information of the vehicle in the process of acquiring the image and the point cloud comprises:
obtaining pose information of the vehicle when the image is acquired by the specified image sensor as benchmark pose information, and obtaining pose information of the vehicle when an acquisition for the point cloud is completed by the lidar within an acquisition overlap region corresponding to the specified image sensor as offset pose information;
determining compensatory pose information for the offset pose information according to the benchmark pose information;
fusing the information of the pixels in the image and the information of the points in the point cloud according to the compensatory pose information; and
controlling the unmanned device according to the fused information according to the compensatory pose information.

13. The storage medium according to claim 12, wherein sending the trigger signal to the specified image sensor comprises:

using an image sensor corresponding to a rotation angle interval in which a rotation angle of the laser emitter obtained at a previous moment is located as a reference image sensor; and
in response to determining that the specified image sensor is not the reference image sensor, sending the trigger signal to the specified image sensor.

14. The storage medium according to claim 12, wherein fusing the information of the pixels in the image and the information of the points in the point cloud according to the compensatory pose information comprises:

determining mapping parameter values according to the compensatory pose information and a relative position between the specified image sensor and the lidar; and
fusing the information of the pixels in the image and the information of the points in the point cloud according to the mapping parameter values.

15. The storage medium according to claim 12, wherein the processor comprises a field-programmable gate array (FPGA).

\* \* \* \* \*